US006358342B1

(12) United States Patent
Instance

(10) Patent No.: US 6,358,342 B1
(45) Date of Patent: Mar. 19, 2002

(54) MANUFACTURE OF SELF-ADHESIVE LABELS

(75) Inventor: David John Instance, Ashford (GB)

(73) Assignee: David J. Instance Limited, Kent (GB)

( * ) Notice: Subject to any disclaimer, the term of this patent is extended or adjusted under 35 U.S.C. 154(b) by 0 days.

(21) Appl. No.: 09/308,712

(22) PCT Filed: Nov. 19, 1997

(86) PCT No.: PCT/GB97/03178

§ 371 Date: May 24, 1999

§ 102(e) Date: May 24, 1999

(87) PCT Pub. No.: WO98/23440

PCT Pub. Date: Jun. 4, 1998

(30) Foreign Application Priority Data

Nov. 28, 1996 (GB) ............................................. 9624826

(51) Int. Cl.[7] ......................... B32B 31/10; B32B 31/18; B32B 35/00; B31D 1/02

(52) U.S. Cl. ......................... 156/64; 156/268; 156/270; 156/277; 156/301; 156/361; 156/362; 156/387; 156/494; 156/510; 156/543; 156/552

(58) Field of Search .......................... 156/64, 248, 267, 156/268, 269, 270, 277, 289, 300, 301, 302, 351, 361, 362, 353, 384, 387, 494, 495, 510, 522, 543, 552

(56) References Cited

U.S. PATENT DOCUMENTS

| | | | | | |
|---|---|---|---|---|---|
| 4,560,432 | A | * | 12/1985 | Instance | 156/384 X |
| 4,690,720 | A | * | 9/1987 | Mack | 156/277 X |
| 4,894,106 | A | * | 1/1990 | Instance | 156/267 X |
| 5,000,812 | A | | 3/1991 | Murphy | |
| 5,021,273 | A | * | 6/1991 | Kobayashi | 156/277 X |
| 5,225,022 | A | | 7/1993 | Baker et al. | |
| 5,262,214 | A | * | 11/1993 | Instance | 156/277 X |
| 5,284,363 | A | * | 2/1994 | Gartner et al. | |
| 5,403,636 | A | * | 4/1995 | Crum | |
| 5,593,749 | A | * | 1/1997 | Instance | 156/267 X |
| 5,679,427 | A | * | 10/1997 | Instance | 156/277 X |
| 5,727,819 | A | * | 3/1998 | Grosskopf et al. | |
| 5,829,789 | A | * | 11/1998 | Treleaven et al. | |
| 5,830,550 | A | * | 11/1998 | Treleaven et al. | |
| 5,863,628 | A | * | 1/1999 | Barry | |

FOREIGN PATENT DOCUMENTS

| | | |
|---|---|---|
| EP | 0153185 | 8/1985 |
| EP | 0390366 | 10/1990 |
| EP | 0552956 | 7/1993 |
| EP | 0684129 | 11/1995 |
| GB | 2164915 | 4/1986 |
| WO | 9104850 | 4/1991 |
| WO | 9531800 | 11/1995 |

* cited by examiner

*Primary Examiner*—Curtis Mayes
(74) *Attorney, Agent, or Firm*—Rothwell, Figg, Ernst & Manbeck

(57) ABSTRACT

A method of producing a succession of self-adhesive labels (6) carried on a backing of release material (8), the method comprising the steps of: (a) providing a first web of release material carrying a succession of folded leaflets (30); (b) conveying the first web along A pathway by a web conveyor, (c) printing a second web (36) with a succession of images along its length by at least one print station (44, 46, 48, 50), the or each print station being driven independently of the web conveyor and being directly or indirectly registered with reference to the first web or the folded leaflets; (d) laminating the printed second web over the succession of folded leaflets; and (e) die-cutting (54, 56) through at least the second web as far as the release material to form a succession of self-adhesive labels. The invention also provides an apparatus for producing a succession of self-adhesive labels carried on a backing of release material in which a control system is provided for registering the at least one print station.

19 Claims, 4 Drawing Sheets

MANUFACTURE OF SELF-ADHESIVE LABELS

The present invention relates to a method of and apparatus for producing a succession of self-adhesive labels carried on a backing of release material.

A number of methods for making multi-layer self-adhesive labels in web form are known. For example EP-A-0153185 discloses a method of producing two-layer self-adhesive labels employing two webs in an on-line operation in which two webs are printed, adhered together and die-cut to form self-adhesive labels in single pass. WO91/04850 and WO91/04851 also disclose methods of producing self-adhesive labels, in particular overlaminated labels. EP-A-0684129 discloses a method of producing labels in which a web is cut to form folded leaflets which are then adhered to a web. EP-A-0179575 discloses an apparatus for making labels off-line.

The present invention aims to provide an improved method of and apparatus for producing labels.

Accordingly, the present invention provides a method of producing a succession of self-adhesive labels carried on a backing of release material, the method comprising the steps of: (a) providing a first web of release material carrying a succession of folded leaflets; (b) conveying the first web along a pathway by a web conveyor; (c) printing a second web with a succession of images along its length by at least one print station, the or each print station being driven independently of the web conveyor and being directly or indirectly registered with reference to the first web or the folded leaflets; (d) laminating the printed second web over the succession of folded leaflets; and (e) die-cutting through at least the second web as far as the release material to form a succession of self-adhesive labels.

The present invention further provides an apparatus for producing a succession of self-adhesive labels, carried on a backing of release material, the apparatus comprising a web conveyor for conveying a first web carrying a succession of folded leaflets, at least one print station for printing a succession of images on a second web, a laminating station for laminating the first and second webs together, with the folded leaflets being disposed therebetween, a die-cutting station for cutting a succession of self-adhesive labels out of a laminated assembly comprising the first and second webs and the folded leaflets therebetween, and a control system for directly or indirectly registering the or each print station with reference to the first web or the folded leaflets.

Embodiments of the present invention will now be described by way of example only, with reference to the accompanying drawings, in which.

Figure 1:
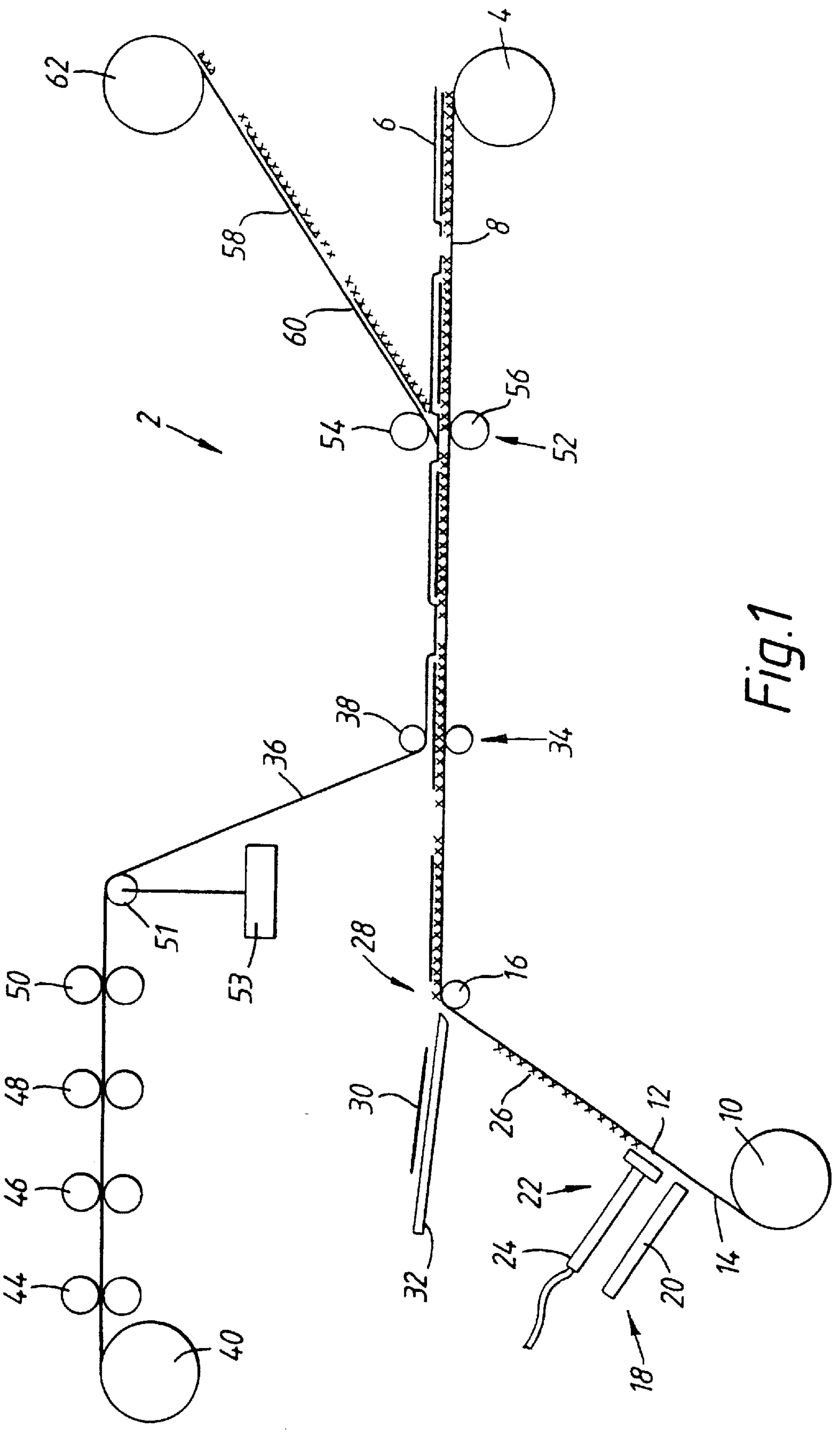
FIG. 1 is a schematic side view of an apparatus for manufacturing labels in accordance with a first embodiment of the present invention.

Referring to FIG. 1, there is shown an apparatus, designated generally as 2, for producing a reel 4 carrying a succession of self-adhesive labels 6. The reel 4 comprises an indeterminate length of a backing web 8 of release material, typically comprising a silicone-faced backing paper. The backing web 8 is provided in a reel 10 of duplex labelstock material 12 comprising a self-adhesive web 14 of paper or plastics which is coated on its reverse side with a pressure-sensitive adhesive and is carried on the release material web B. For convenience, in FIG. 1 the two webs 14, 8 comprising the labelstock material 12 are shown as an integrated single web. The reel 10 is mounted in the apparatus 2 as a supply reel.

The self-adhesive web 14 of the labelstock material 12 has been subjected to an initial pre-treatment step prior to being supplied as the reel 10 in the apparatus 2. In particular, the self-adhesive web 14 has been printed and/or die-cut. In such a pre-printing operation, the upper surface of the self-adhesive web 14 is printed with a succession of images along its length, each image being intended to be present in a respective resultant self-adhesive label 6. In such a die-cutting step, the self-adhesive web 14 is die-cut to form a succession of self-adhesive base labels along the length of the release material 8, each base label being intended to be incorporated into a respective resultant self-adhesive label 6 as a support piece therefor. Following the die-cutting step, the waste web skeleton of the self-adhesive web surrounding the die-cut base labels is removed from web.

The labelstock material 12 so pre-treated is fed out from the reel 10 thereof over one or more guide rollers 16 of a web conveyor, which web conveyor may also drive the reels 10 and 4. The labelstock material 12 initially passes to a detecting station 18 at which a sensor 20, which is preferably a photodetector, is adapted to detect a succession of pre-printed marks along the length of the labelstock material 12 or alternatively, when the labelstock material has been die-cut as described above to form a succession of base labels, to detect the succession of base labels. The labelstock material 12 then passes to an adhesive applying station 22 at which an adhesive applicator 24 extrudes adhesive, for example a water-soluble or hot melt adhesive, as a series of patches 26 onto the upper surface of the labelstock material. 12. When the self-adhesive web 14 is pre-printed with a succession of images along its length, the adhesive patches are applied in registration with the printed images.

Thereafter the labelstock material 12 is conveyed to a leaflet applying station 28 at which a succession of folded leaflets 30 are applied to the succession of patches 26 of adhesive by a folded leaflet applicator 32. In this specification, the term "leaflet" is intended to cover not only leaflets but also booklets and other folded paper pieces. The folded leaflet applicator 32 is represented simply by a ramp in FIG. 1 but may comprise a label feed system such as disclosed in EP-A-0684129. The folded leaflet applicator 32 may incorporate a servo control system which is adapted instantaneously (or after a delay) to advance or retard the operation of the folded leaflet applicator 32 so that the application of the folded leaflets 30 can "chase" the position of the underlying labelstock material 12 so that the folded leaflets 30 are applied in registration with the patches 26 of adhesive and the labelstock material 12.

The sensor 20 operates in conjunction with a control system to coordinate the application of the adhesive patches 26 and of the folded leaflets 30 to the self-adhesive web 12 so that both the adhesive patches 26 and the folded leaflets 30 coincide at the correct point on the web in registry with any printed images on the self-adhesive web 14 and, where appropriate, coincide in registry with the underlying die-cut self-adhesive base labels. If desired delay may be present between the detection of the succession of pre-printed marks and the operation of the adhesive applicator 24 and/or the folded leaflet applicator 32.

The labelstock material carrying the folded leaflets 30 adhered thereto by the patches 26 of adhesive then passes to a laminating station 34 at which a printed web 36 of paper or plastics is laminated over the assembly of the folded leaflets 30 on the labelstock material 12. The combined webs 36,12, and the folded leaflets 30 therebetween are passed through a pair of opposed laminating rollers 38. The overlaminating web 36 has been supplied in the apparatus 2 as an unprinted reel 40 thereof which is unwound and, upstream of the laminating station 34, printed on either one or both sides thereof by a succession of print stations 44,46,48,50. Each of the print stations 44,46,48,50 is independently driven and is registered with reference either to the labelstock material 12 or to the applied folded-leaflets 30 whereby each image printed by the printing-stations 44,46, 48,50 on the laminating web 36 is in registry with a respective folded leaflet 30 which in turn is in registry with the underlying printed self-adhesive web 14 or base label die-cut therefrom.

Each of the print stations 44,46,48,50 is not only independently driven with respect to each of the other print stations 44,46,48,50, but also independently driven with respect to the web conveyor for the labelstock material 12. Accordingly, each of the print stations 44,46,48,50 may be individually registered with respect to the laminating web 36 so that the images printed by the print stations 44,46,48,50 may in turn be registered with respect to the labelstock material or to a subsequent operation, such as die-cutting, performed on the labelstock material 12. Since the print stations 44,46,48,50 are independently driven, and thus can be rotated relative to the laminating web when the print stations 44,46,48,50 require re-registration with respect to the laminating web 36, it is necessary in accordance with the preferred aspects of the invention for the print units of the print stations 44,46,48,50 to be moved without moving the laminating web 36. Otherwise, the laminating web could be moved with respect to the labelstock material to which the laminating web is intended to be laminated following the printing steps, which could in turn lead to mis-registration problems.

Accordingly, the web drive, represented by roller 51 but also preferably driving the reel 40, incorporates a web tension control 53 illustrated schematically in FIG. 1. The web tension control 53 operates to prevent inadvertent additional forward or backward movement of the laminating web as a result of the printing process over and above the predetermined speed of the laminating web which is imparted by the web drive 51. The web tension control 53 acts to isolate the laminate web drive from influence by the printing processes, which involve relative movement of the print stations and the moving laminating web 36. Typically, the web tension control 53 may comprise a brake which is provided at the upstream end of the web drive 51 so as to prevent forward movement of the laminating web being imparted by the printing operation. Alternatively the web tension control may comprise a series of wraps downstream of the printing stations which are arranged to constrain any forward movement of the laminating web imparted thereto as a result of the printing operation.

The composite.overlaminated assembly then passes from the laminating station 34 to a die-cutting station 52 comprising an upper die-cutting roller 54 and an opposed lower backing roller 56 between which the composite assembly is passed. The die-cutting roller 54 cuts out from the overlaminating web 36, the applied folded leaflets 30, the underlying patches of adhesive 26 and the self-adhesive web 14, or base labels previously die-cut therefrom a succession of the self-adhesive labels 6 carried on the backing of release material B. The waste web remnant 58 comprises the waste skeleton Go of the overlaminating web together with waste portions of the folded leaflets 30 and the adhesive patches 26 adhered thereto and is wound into a waste reel 62. Like the print stations, the die-cutting roller 54 is also independently driven and registered with reference to the self-adhesive web 14 the applied folded leaflets 30.

Figure 2:
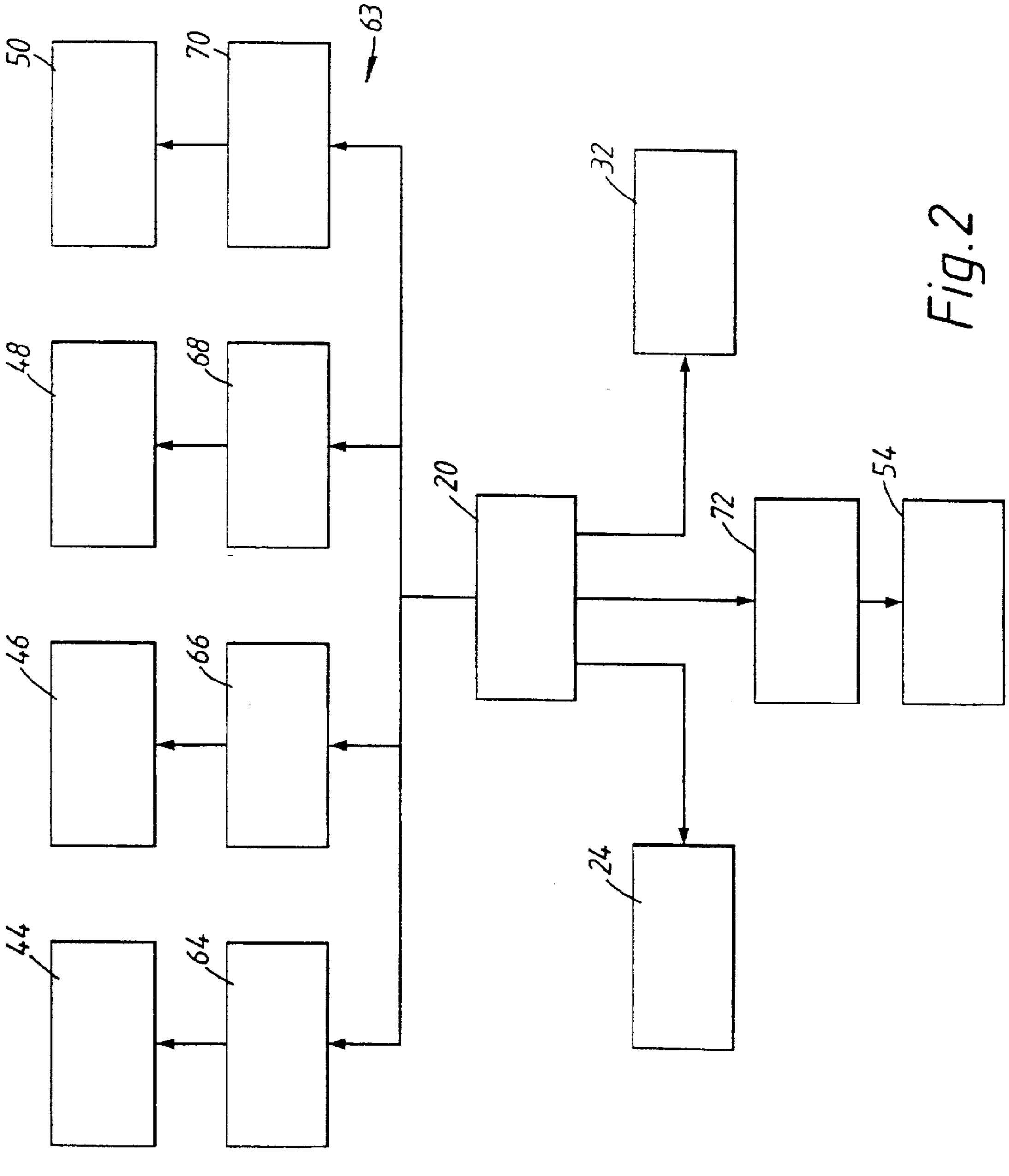
FIG. 2 is a schematic representation of a control system of the apparatus of FIG. 1.

FIG. 2 shows a control system, designated generally as 63, for registry of the printed images printed on the laminating web 36 by the printing stations 44,46,48,50 with the applied adhesive patches 26 and folded leaflets 30 and with the subsequent die-cutting operation performed at the die-cutting station 52 .

As shown in FIG. 2, the sensor 20 is coupled in the control system 63 to the adhesive applicator 24 and to the leaflet applicator 32. Thus when the sensor 20 detects a pre-printed mark on the labelstock material 12, or detects a previously die-cut base label of the labelstock material 12, a signal is emitted from the sensor 20 which is employed by the control system 63 to ensure that the patches of adhesive 26 are applied in registry lesith the labelstock material 12 by the adhesive applicator 24 and also the folded leaflets 30 are applied in registry with the patches 26 of adhesive by the leaflet applicator 32 (which may incorporate a servo control system as aforesaid). The signal from the sensor 20 is also employed to control a respective servo control system 64,66,68,70 for the respective series of independently driven print stations 44,46,48,50. Thus the printing of the images on the laminating web 36 is controlled with respect to the underlying lablestock material web 12 so as to ensure that in the resultant self-adhesive labels 6, the images printed on the laminating web 36 are in registry with any underlying printed images on the labelstock material 12.

The sensor 20 also emits a signal to control a servo control 72 for the die-cutting roller 54 so that the resultant self-adhesive labels 6 are accurately die-cut in registry with the printed images on the laminating and labelstock webs 36,12 and with respect to the applied folded leaflets 30. Each servo control 64,66,68,70 for the printing stations 44,46,48, 50 and the servo control 72 for the die-cutting roller 54 act instantaneously or after a delay to advance or retard either the printing cylinder or the die-cutting roller whereby the printing cylinder or the die-cutting roller is registered with respect to the underlying labelstock material.

In an alternative embodiment of the control system illustrated in FIG. 2, the sensor 20 which emits a signal which is employed to control the leaflet applicator 32 may not directly employ a registration signal for registering the print stations 44,46,48,50. Rather, the servo controls 64,66, 68,70 for those print stations 44,46,48,50 may receive a signal derived from the leaflet applicator 32 which in turn has been registered to the labelstock web 12 by the sensor 20.

In a yet further alternative embodiment of the control system illustrated in FIG. 2, the sensor 20 emits a signal which is employed to control the operation of the die-cutting roller 54 and then the operation of the print stations 44,46, 48,50 may be controlled with respect to a signal derived from the die-cutting station 52. The signal which is employed to control the leaflet applicator 32 may come either from the sensor 20 or from the die-cutting station 52. In this way, the position of the die-cutting roller 54 can be employed to control the printing of the laminating web 36 which is required to be in registry with the die-cuts made to for m the resultant self-adhesive labels 6 and/or to control the operation of the leaflet applicator 32 which is required in turn to apply leaflets 30 to the labelstock material 12 which are ultimately in registry with the die-cuts made to form the self-adhesive labels 6.

In a still further embodiment of the control system illustrated in FIG. 2, the sensor 20 can provide a control signal to the servo control 64 of the first i.e. most upstream print station 44 and further control signals are sent in cascade-fashion from the first print station 44 to the remaining print stations 46,48,50 whereby the second and succeeding print stations 46,48,50 are independently controlled so as to be in registry with the first print station 44.

In a further embodiment of the present invention the laminating web 36 may be self-adhesive, preferably a transparent plastics self-adhesive web. When such a web is employed, the reel 40 may comprise a web of such self-adhesive material carried on a backing of release material, and the backing of release material is removed from the self-adhesive web after the printing operation and prior to lamination at the laminating station 34.

As an alternative to a self-adhesive laminating web 36, the laminating web 36 may be heat sealable to the underlying folded leaflets 30 and/or self-adhesive material 14. The heat sealed area may be patterned so that for example the folded leaflet 30 is heat sealed around its periphery but not heat sealed directed to the upper surface of the folded leaflet 30. The heat sealing may be achieved by using heated laminating rollers 38.

When a self-adhesive or heat sealable laminating web 36 is employed, the method-and apparatus of the invention may not require the use of adhesive applied by the adhesive applicator 24. Accordingly, in certain embodiments of the invention, the folded leaflets 30 may simply be sandwiched between the labelstock material 12 and the laminating web 30 without being directly adhered to the upper surface of the labelstock material 12, with the folded leaflet 30 being held in a closed configuration by the adhesion of the laminating web 36 to the underlying self-adhesive material 14 and/or release material 8.

In the illustrated embodiments of the present invention, the print stations 44,46,48,50 may comprise flexographic printing stations as are conventionally employed in the manufacture of self-adhesive labels. Alternatively, the print stations 44,46,48,50 may comprise digital print stations as disclosed in EP-0684130. Each digital print station preferably working with a dry toner process which typically is of a type similar to those employed in colour photocopiers or laser printers or with a wet toner process. The printing process may a direct or off-set digital process. When the print stations 44,46,48,50 are digital print stations, this provides the technical advantage of the present invention permitting the marrying of digital printing for the top surface of the label coupled with the use of conventional flexographic web printing for the underlying base web. In addition, the method of the invention can provide the advantage that digital printing units can print variable information on the overlaminating web.

Figure 3:
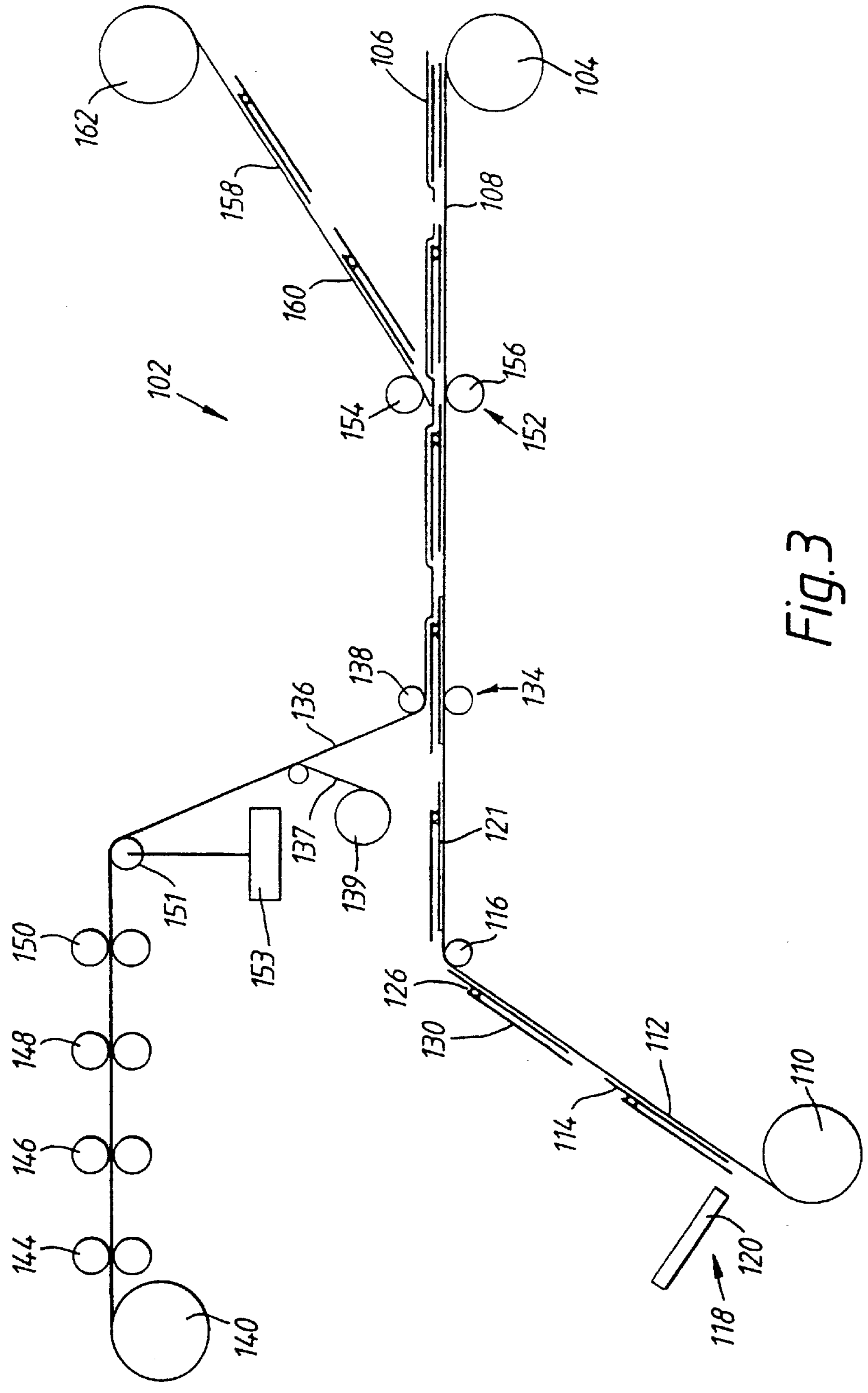
FIG. 3 is a schematic side view of an apparatus for manufacturing labels in accordance with a second embodiment of the present invention.

FIG. 3 illustrates a second embodiment of an apparatus designated generally as 102 for producing labels in accordance with the present invention which is a modification of the embodiment of FIG. 1. In FIG. 3, the laminating web 136 is, in the same manner as the embodiment of FIG. 1, printed by a plurality of independently driven print stations 144, 146,148,150. The so-printed laminating web 136 is laminated to a web 108 of release material to which have already been applied a succession of folded leaflets 130 each being carried on a respective self-adhesive support piece 114. In this embodiment also, the laminating web 136 is self-adhesive and a release backing web 137 is removed therefrom upstream of the laminating station 134 comprising the laminating rollers 138, the release web 137 being wound into a reel 139. The laminating web 136 and the release backing web 137 are formed as a reel 140 which is fed successively through the print stations 144,146,148,150 by the web drive device, represented schematically by the roller 151 and with the web drive device 151 having a web tension control 153 as schematically illustrated in FIG. 3. The print stations 144,146,148,150 are arranged to print only the upper surface of the laminating web 136.

A reel 110 comprising a backing 108 of release material carrying a succession of die-cut self-adhesive support pieces 114 thereon, with each support piece 114 having adhered thereto by a layer 126 of adhesive a folded leaflet 130, is fed out past a detecting station 118 at which a sensor 120 detects either a printed registration mark printed on the support piece 114 or the folded leaflet 130 or the leading or trailing edge of the intermediate label 121 comprising the assembly of the folded leaflet 130 adhered to the support piece 114. The web is fed over a guide roller 116 to the laminating station 134 comprising the laminating rollers 138 at which the laminating web 136 is laminated over the intermediate labels 121 with the printed images on the laminating web 136 being in registry with the underlying succession of intermediate labels 121.

The composite laminated assembly then passes to a die-cutting station 152 comprising an upper die-cutting roller 154 and a backing roller 156 at which a succession of self-adhesive labels 106 are cut out and the waste web remnant 158 comprising the waste web skeleton 160 of the laminating web 136 together with waste portions of the folded leaflets 130 and support pieces 114 adhered thereto are wound into a waste reel 162. The release backing material 108 carrying the self-adhesive labels is wound into a reel 104.

Figure 4:
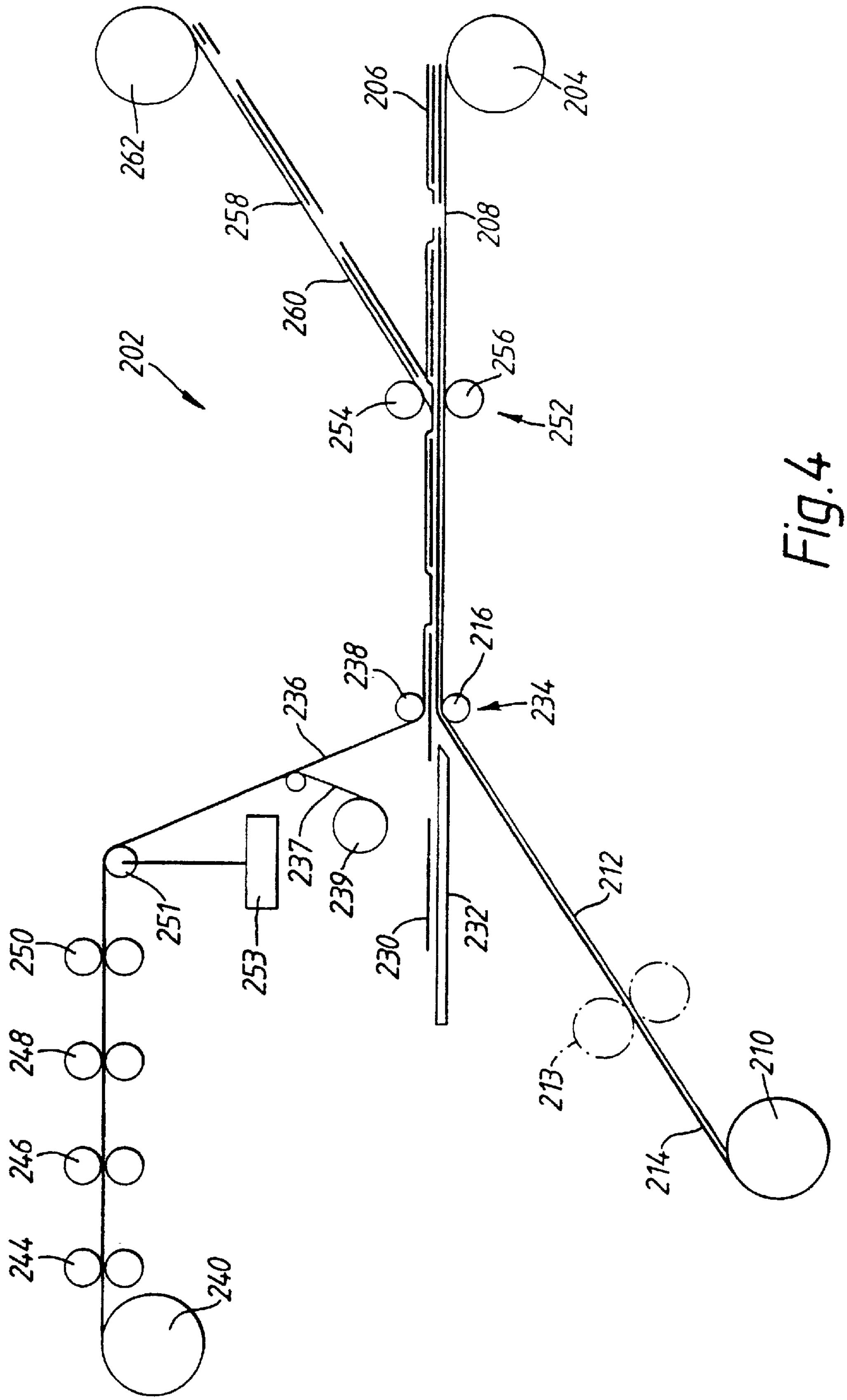
FIG. 4 is a schematic side view of an apparatus for manufacturing labels in accordance with a third embodiment of the present invention.

A further embodiment of the apparatus of the present invention is illustrated in FIG. 4. The apparatus, generally designated as 202, of FIG. 4 is a further modification of the apparatus of FIG. 1. In this apparatus, the laminating web 236 is printed by a plurality of print stations 244,246,248, 250 in a manner similar to that described with reference to FIG. 1 and the laminating web 236 is laminated over a succession of folded leaflets 230 which are carried on either an unprinted labelstock material 212 or in a further modification, over a printed labelstock material which has been printed in line by at least one printing station 213 illustrated in phantom in FIG. 4. The assembly of overlaminated folded leaflets 230 then passes from the laminating station 234, constituted by the laminating rollers 238, to a die-cutting station 252, constituted by an upper die-cutting roller 254 and a lower backing roller 256, at which a succession of self-adhesive labels 206 is cut out from the laminar material 236, the folded leaflets 230 and the self-adhesive material 214 of the labelstock material 212. The succession of self-adhesive labels 206 carried on the backing 208 of release material is wound into a reel 204. The waste web remnant 258 produced in the cutting step and including the waste web skeleton 260 of the laminating material 236 and waste portions of the folded leaflets 230 and of the self-adhesive material 214 are wound into a reel 262.

The labelstock material 212 is fed out from a reel 210 thereof through the optional at least one printing station 213 directly to the laminating station 234. At the laminating station 234, a succession of folded leaflets 230 are fed by the folded leaflet applicator 232 into a nip point formed by the laminating rollers 238 whereby the succession of folded leaflets 230 are sandwiched between-the upper laminating material 236 and the lower self-adhesive material 214. In the illustrated embodiment, the laminating material 236 is self-adhesive and a backing web 237 of release material has been removed from the laminating material 236 and wound up into a reel 239 thereof downstream of the series of print stations 244,246,248,250. The laminating material 236 together with the release web 237 have been wound out from a reel 240 thereof, through the print stations 244,246,248, 250 and fed by a web conveyor represented generally at 251 which, as in the other two embodiments, is provided with a web tension control illustrated schematically at 253.

The embodiment of FIG. 4 comprises an on-line apparatus in which no pre-treatment in the form of die-cutting or printing has been carried out on the labelstock material 212. The folded leaflet applicator 232 is pre-set so that the folded leaflets 230 are applied in the correctly spaced succession along the length of the labelstock material 212. Since the.labelstock material 212 has not been subjected to a previous printing or die-cutting operation, there is no requirement for a sensor to re-register the labelstock material 212 in the apparatus with respect to the subsequent folded leaflet 230 application. The at least one printing unit 213 for the labelstock material 212 may in turn be linked mechanically to the web conveyor for the labelstock material 212.

The print stations 244,246,248,250, being independently controlled and controlled independently of the web conveyor for the labelstock material, maybe controlled so as to ensure that the images printed thereby are ultimately in registry with the respective self-adhesive labels. Accordingly, the print stations 244,246,248,250 may receive electrical control signals from the die-cutting station 252 or the folded leaflet applicator 232. In the case where the control signal is emitted from the die-cutting station 252, the die-cutting station as a master unit from which the print stations 244,246,248,250 and also the label applicator 232 are controlled. Similarly, when the label applicator 232 is the master control unit, the print stations 244,246,248,250 and also the die-cutting station 252 are slaved to the label applicator 232. In the alternative arrangement where on-line printing of the labelstock material is performed by the optional print unit 213, in a similar manner the print unit 213 could act as a master or slave control along with the print stations 2442,46,248,250, the die-cutting station 252 and the label applicator 232. Finally, in this embodiment it is possible for the first independently driven print station 244 to constitute the master unit and for all of the other remaining print stations 246,248,250 as well as the applicator 232 and the die-cutting station 252 to be slaved to the first print station 244.

What is claimed is:

1. A method of producing a succession of self-adhesive labels carried on a backing of release material, the method comprising the steps of:

(a) providing a first web of release material carrying a succession of folded leaflets;

(b) conveying the first web along a pathway by a web conveyor;

(c) printing a second web with a succession of images along its length by at least one print station, the or each print station being driven independently of the web conveyor and being directly or indirectly registered with reference to the first web or the folded leaflets;

(d) laminating the printed second web over the succession of folded leaflets; and (e) die-cutting through at least the second web as far as the release material to form a succession of self-adhesive labels.

2. A method according to claim 1 wherein the first web additionally carries a web, or die-cut base labels, of a self-adhesive material, the folded leaflets being disposed on the self-adhesive material.

3. A method according to claim 2 wherein a sensor is arranged to detect a succession of locations along the self-adhesive material and the at least one print station is registered with reference to the self-adhesive material or the folded leaflets by a signal from the sensor.

4. A method according to claim 2 further comprising the step of applying the folded leaflets to the self-adhesive material and wherein a sensor is arranged to register the application of the folded leaflets on the self-adhesive material and the at least one print station is registered with reference to the applied folded leaflets.

5. A method according to claim 2 wherein the die-cutting step is performed in registration with the self-adhesive material.

6. A method according to claim 2 further comprising the step of applying the folded leaflets to the self-adhesive material and wherein the application of the folded leaflets, printing and-die-cutting are registered together.

7. A method according to claim 6 wherein the second web is unprinted.

8. A method according to claim 6 wherein the second web is printed on-line immediately prior to application of the folded leaflets.

9. A method according to claim 1 wherein the printing step (c) is carried out by a plurality of digital print stations.

10. A method according to claim 1 further comprising controlling the tension of the second web during the printing operation so as substantially to prevent longitudinal movement of the second web relative to the first web.

11. An apparatus for producing a succession of self-adhesive labels carried on a backing of release material, the apparatus comprising a web conveyor for conveying a first web carrying a succession of folded leaflets, at least one print station for printing a succession of images on a second web, a laminating station for laminating the first and second webs together, with the folded leaflets being disposed therebetween, a die-cutting station for cutting a succession of self-adhesive labels out of a laminated assembly comprising the first and second webs and the folded leaflets therebetween, and a control system for driving the or each print station independently of the conveyor and in direct or indirect registration with reference to the first web or the folded leaflets.

12. An apparatus according to claim 11 wherein the at least one print station comprises a printing unit and a registration device which is arranged to advance or retard the operation of the printing unit whereby the printing of an image is controlled in response to a registration signal from the control system.

13. An apparatus according to claim 12 wherein the control system includes a sensor for detecting a succession of locations along the first web and the control system employs a signal from the-sensor to control the registration device of the at least one print station.

14. An apparatus according to claim 11 further comprising a folded leaflet applicator for applying the succession of folded leaflets to the first web.

15. An apparatus according to claim 14 wherein the control system registers together the folded leaflet applicator, the die-cutting station and at least one of the at least one print station.

16. An apparatus according to claim 11 wherein the control system is arranged to register the die-cutting station with reference to a succession of locations along the first web.

17. An apparatus according to claim 11 wherein the at least one print station comprises a digital print station.

18. A method of producing a succession of self-adhesive labels carried on a backing of release material, the method comprising the steps of:

(a) providing a first web of release material carrying a succession of folded leaflets;

(b) conveying the first web along a pathway at a predetermined speed by a web conveyor;

(c) printing a second web with a succession of images along its length by at least one print station, the or each print station being driven independently of the web conveyor and being directly or indirectly registered with reference to the first web or the folded leaflets;

(d) laminating the printed second web over the succession of folded leaflets; and (e) die-cutting through at least the second web as far as the release material to form a succession of self-adhesive labels;

(f) controlling the tension of the second web to prevent inadvertent additional movement of the second web as a result of the printing process over and above the predetermined speed.

19. An apparatus for producing a succession of self-adhesive labels carried on a backing of release material, the apparatus comprising a web conveyor for conveying a first web carrying a succession of folded leaflets at a predetermined speed, at least one print station for printing a succession of images on a second web, a laminating station for laminating the first and second webs together, with the folded leaflets being disposed therebetween, a die-cutting station for cutting a succession of self-adhesive labels out of a laminated assembly comprising the first and second webs and the folded leaflets therebetween, a control system for driving the or each print station independently of the web conveyor and in direct or indirect registration with reference to the first web or the folded leaflets, and a web tension control to control the tension of the second web to prevent inadvertent movement of the second web as a result of the printing process over and above the predetermined speed.

* * * * *